(12) United States Patent
Lettau et al.

(10) Patent No.: US 9,961,296 B2
(45) Date of Patent: May 1, 2018

(54) METHODS AND APPARATUS FOR MANDATORY VIDEO VIEWING

(75) Inventors: Ty Lettau, Hercules, CA (US); Kim Pimmel, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2162 days.

(21) Appl. No.: 11/833,305

(22) Filed: Aug. 3, 2007

(65) Prior Publication Data

US 2014/0304730 A1 Oct. 9, 2014

(51) Int. Cl.
| | | |
|---|---|---|
| H04N 5/91 | (2006.01) | |
| G06F 3/0485 | (2013.01) | |
| G06F 3/0481 | (2013.01) | |
| H04N 21/414 | (2011.01) | |
| H04N 21/4367 | (2011.01) | |
| H04N 21/454 | (2011.01) | |
| H04N 21/81 | (2011.01) | |

(52) U.S. Cl.
CPC .......... *H04N 5/91* (2013.01); *G06F 3/04817* (2013.01); *G06F 3/04855* (2013.01); *H04N 21/41407* (2013.01); *H04N 21/4367* (2013.01); *H04N 21/4542* (2013.01); *H04N 21/812* (2013.01)

(58) Field of Classification Search
CPC ............... H04N 5/91; H04N 21/41407; H04N 21/4367; H04N 21/4542; H04N 21/812; G06F 3/04817; G06F 3/04855
See application file for complete search history.

(56) References Cited

U.S. PATENT DOCUMENTS

| | | | |
|---|---|---|---|
| 5,892,536 A | 4/1999 | Logan | |
| 5,986,692 A | 11/1999 | Logan | |
| 6,988,245 B2* | 1/2006 | Janevski | 715/723 |
| 7,055,166 B1 | 5/2006 | Logan et al. | |
| 2002/0194593 A1* | 12/2002 | Tsuchida et al. | 725/32 |
| 2003/0149975 A1* | 8/2003 | Eldering et al. | 725/34 |
| 2003/0154475 A1* | 8/2003 | Rodriguez et al. | 725/32 |
| 2003/0163832 A1* | 8/2003 | Tsuria et al. | 725/135 |
| 2003/0195974 A1* | 10/2003 | Ronning et al. | 709/230 |
| 2003/0212997 A1* | 11/2003 | Hejna, Jr. | 725/88 |
| 2004/0003398 A1* | 1/2004 | Donian et al. | 725/34 |
| 2007/0263984 A1* | 11/2007 | Sterner et al. | 386/95 |
| 2007/0266399 A1* | 11/2007 | Sidi | 725/42 |
| 2008/0066107 A1* | 3/2008 | Moonka et al. | 725/42 |
| 2008/0212937 A1* | 9/2008 | Son | G06Q 30/02 386/241 |
| 2008/0222546 A1* | 9/2008 | Mudd et al. | 715/765 |
| 2009/0024927 A1* | 1/2009 | Schrock et al. | 715/722 |

* cited by examiner

*Primary Examiner* — Chenea Smith
(74) *Attorney, Agent, or Firm* — Kilpatrick Townsend & Stockton LLP

(57) ABSTRACT

A system renders a graphical representation of a timeline of a first video in a graphical user interface. The system receives a notification during playback of the first video at a first location in the first video. The notification indicates a request to playback the first video at a second location in the first video. The system determines that a second video is renderable during the first video between the first location and the second location. The system determines a viewing status associated with the user. The viewing status indicates whether the second video has been previously rendered for a user account on a client machine, and determines whether the user may view the first video at a second location in the first video, based on the viewing status associated with the user.

18 Claims, 16 Drawing Sheets

205 IN A GRAPHICAL USER INTERFACE, RENDER A GRAPHICAL REPRESENTATION OF A TIMELINE OF A FIRST VIDEO

206 RENDER A VIEWABLE VIDEO ICON INDICATING A SEGMENT OF THE VIDEO THAT HAS BEEN VIEWED BY THE USER

OR

207 RENDER A DOWNLOADED VIDEO ICON INDICATING A SEGMENT OF THE VIDEO THAT HAS BEEN DOWNLOADED AND AVAILABLE TO THE USER TO VIEW

FIG. 10

211 DETERMINE THAT A SECOND VIDEO IS RENDERABLE DURING THE FIRST VIDEO BETWEEN THE FIRST LOCATION AND THE SECOND LOCATION

212 IDENTIFY THE SECOND VIDEO AS AN ADVERTISEMENT

OR

213 IDENTIFY THAT VIEWING THE SECOND VIDEO IS MANDATORY

OR

214 RECEIVE A PLAYLIST INDICATING AT LEAST ONE OF:
i) THE SECOND VIDEO, AND
ii) A LOCATION IN THE FIRST VIDEO IN WHICH THE SECOND VIDEO IS TO BE RENDERED

215 RENDER THE SECOND VIDEO ACCORDING TO THE PLAYLIST

*FIG. 12*

227 IDENTIFY THE VIEWING STATUS AS INDICATING THAT THE USER HAS VIEWED THE SECOND VIDEO

228 RENDER A BLOCKING ICON INDICATING THAT THE USER MUST VIEW THE SECOND VIDEO AGAIN PRIOR TO VIEWING THE FIRST VIDEO AT THE SECOND LOCATION

OR

229 REMOVE THE SECOND VIDEO FROM THE FIRST VIDEO

OR

230 REPLACE THE SECOND VIDEO WITH A THIRD VIDEO

*FIG. 15*

231 DETERMINE WHETHER THE USER MAY VIEW THE FIRST VIDEO AT A SECOND LOCATION IN THE FIRST VIDEO, BASED ON THE VIEWING STATUS ASSOCIATED WITH THE USER

232 IDENTIFY THE VIEWING STATUS AS INDICATING THAT THE USER HAS NOT VIEWED THE SECOND VIDEO

233 RENDER A BLOCKING ICON INDICATING THAT THE USER MAY NOT VIEW THE FIRST VIDEO AT THE SECOND LOCATION UNTIL THE SECOND VIDEO HAS BEEN VIEWED BY THE USER

*FIG. 16*

METHODS AND APPARATUS FOR MANDATORY VIDEO VIEWING

BACKGROUND

Conventional technologies for presenting advertisements to potential customers provide a variety of mediums in which to present those advertisements. For example, advertisements can be displayed in television shows where the advertisements are rendered in between segments of the television show. Television networks often provide (previously aired) episodes of network shows on television network web sites. Users may go to the television networks web sites, and download videos of episodes to view. Once downloaded, users may render the videos in a video rendering application. The video rendering application typically provides a graphical user interface in which the user may start, stop, pause, resume, rewind, and fast forward through the video. Many users frequently take advantage of the fast forward option to fast forward through advertisements inserted into the downloaded videos.

SUMMARY

Conventional technologies for rendering downloaded videos suffer from a variety of deficiencies. In particular, conventional technologies for rendering downloaded videos are limited in that users may advance through the video (i.e., 'fast forward') to avoid viewing the advertisements inserted in the videos. Advertisers pay the television networks to have advertisements displayed during television shows. Television networks rely on the steady stream of revenue provided by the advertisers. Advertisers are not willing to pay television networks for advertisements if users don't view those advertisements. If users are able to advance (i.e., 'fast forward') past the advertisements, the television networks lose revenue, and the advertisers lose a method of marketing to potential customers.

Embodiments disclosed herein significantly overcome such deficiencies and provide a system that includes a computer system executing a mandatory video viewing process that prevents a user from advancing through a video (i.e., a first video), past an advertisement (i.e., a second video), until that user has viewed the advertisement (i.e., the second video). Once the user views the advertisement, the user is able to advance the video past the advertisement. Should the user choose to rewind the video, the user is able to advance past any advertisements that the user has previously viewed. The mandatory video viewing process may provide a graphical user interface that displays icons and/or graphics indicating:

i) the segment of the video that has been viewed,
  ii) the segment(s) of the video that have been downloaded and are available for viewing, and
  iii) the segments of the video that must be viewed (i.e., advertisements) prior to a user advancing past those segments.

It should be noted that the use of the term icons may also refer to graphics and/or graphical objects. In an example embodiment, a log file maintains information regarding whether the user has viewed the advertisements. Once the user has viewed an advertisement, the mandatory video viewing process updates the log file indicating that the user has viewed the log file.

The mandatory video viewing process renders a graphical representation of a timeline of a first video in a graphical user interface. The mandatory video viewing receives a notification during playback of the first video at a first location in the first video. The notification indicates a request to playback the first video at a second location in the first video. The mandatory video viewing process determines that a second video is renderable during the first video between the first location and the second location, and determines a viewing status associated with the user. The viewing status indicates whether the second video has been previously rendered for a user account on a client machine. The mandatory video viewing process determines whether the user may view the first video at a second location in the first video, based on the viewing status associated with the user.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 10 illustrates a flowchart of a procedure performed by the system of FIG. 8, when the mandatory video viewing process renders a graphical representation of a timeline of a first video and renders a viewable video icon indicating a segment of the video that has been viewed by the user, according to one embodiment disclosed herein.

FIG. 12 illustrates a flowchart of a procedure performed by the system of FIG. 8, when the mandatory video viewing process determines that a second video is renderable during the first video between the first location and the second location, according to one embodiment disclosed herein.

FIG. 15 illustrates a flowchart of a procedure performed by the system of FIG. 8, when the mandatory video viewing process identifies the viewing status as indicating that the user has viewed the second video, according to one embodiment disclosed herein.

FIG. 16 illustrates a flowchart of a procedure performed by the system of FIG. 8, when the mandatory video viewing process determines whether the user may view the first video at a second location in the first video, and identifies the viewing status as indicating that the user has not viewed the second video, according to one embodiment disclosed herein.

DETAILED DESCRIPTION

Embodiments disclosed herein include a computer system executing a mandatory video viewing process that prevents a user from advancing through a video (i.e., a first video), past an advertisement (i.e., a second video), until that user has viewed the advertisement (i.e., the second video). Once user views the advertisement, the user is able to advance the video past the advertisement. Should the user choose to rewind the video, the user is able to advance past any advertisements that the user has previously viewed. The mandatory video viewing process provides a graphical user interface that displays icons indicating the segment of the video that has been viewed, the segment(s) of the video that have been downloaded and are available for viewing, and the segments of the video that must be viewed (i.e., advertisements) prior to a user advancing past those segments.

Figure 1:
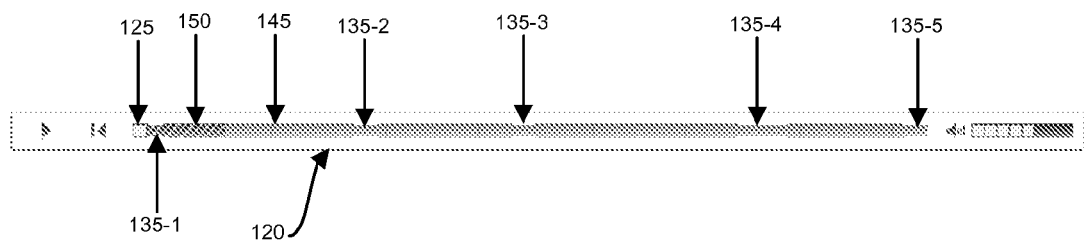
FIG. 1 illustrates an example timeline as a first video is rendered, according to one embodiment disclosed herein.

FIG. 1 illustrates an example timeline 120 containing a first video 145, and a second video. At the beginning of the first video 145, a second video is rendered. In an example embodiment, the second video is an 'in roll' segment that a publisher of the first video 145 has determined to be mandatory viewing before the first video 145 can be rendered. Thus, the viewable video icon 125 is stationed at the beginning of the timeline 120. The timeline 120 also contains a plurality of blocking icons 135-N (i.e., 135-1, 135-2, 135-3, 135-4, and 135-5) that represent segments in the first video 145 where a user must view other (second) videos. FIG. 1 also illustrates a non viewable icon 150 depicting a segment of the first video 145 that is downloaded. However, a user cannot advance through that segment of the first video 145.

Figure 2:
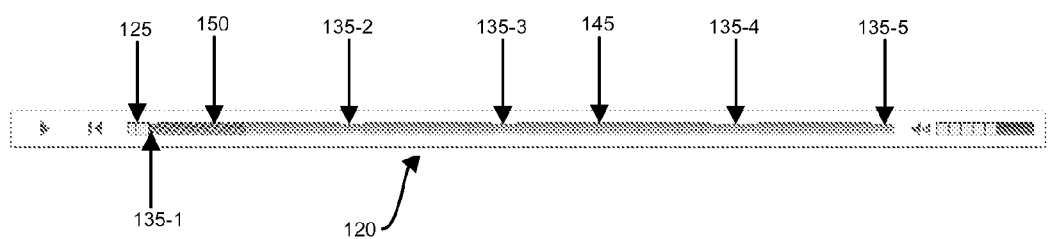
FIG. 2 illustrates an example timeline as the viewable video icon advances toward the second video, according to one embodiment disclosed herein.

FIG. 2 illustrates an example timeline 120 containing a first video 145, and a second video. The second video is being rendered (i.e., a user is viewing an advertisement). Thus, the timeline 120 displays the viewable video icon 125 carving through the blocking icon 135-1. The timeline 120 also displays the locations in the first video 145 where the remaining blocking icons 135-N (i.e., 135-2, 135-3, 135-4, and 135-5) are located. FIG. 2 also illustrates a non viewable icon 150 depicting a segment of the first video 145 that is downloaded. However, a user cannot advance through that segment of the first video 145.

Figure 3:
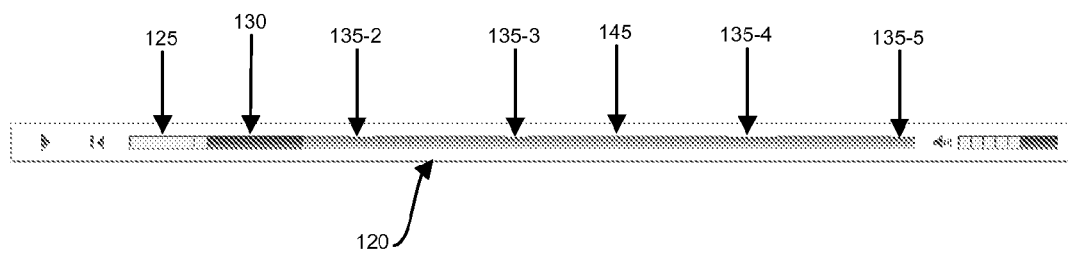
FIG. 3 illustrates an example timeline where the second video has been viewed, according to one embodiment disclosed herein.

FIG. 3 illustrates an example timeline 120 containing a first video 145 where viewable video icon 125 has advanced past the blocking icon 135-1 displayed in FIG. 2. Thus, the blocking icon 135-1 no longer exists in this example timeline 120. The timeline 120 displays the downloaded video icon 130 indicating the segment of the first video 145 that is downloaded and available for the user to view. The viewable video icon 125 represents how far along the timeline 120 the user has viewed the first video 145. The timeline 120 also displays the locations in the first video 145 where the remaining blocking icons 135-N (i.e., 135-3, 135-4, and 135-5) are located.

Figure 4:
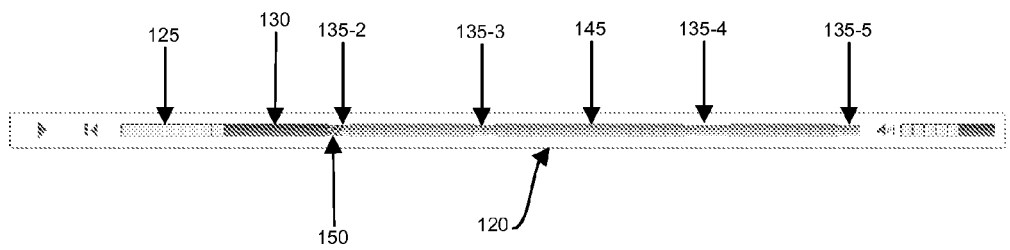
FIG. 4 illustrates an example timeline where a bottleneck caused by a second video is cleared, according to one embodiment disclosed herein.

FIG. 4 illustrates an example timeline 120 containing a first video 145, and a second video. The timeline 120 displays that the viewable video icon 125 has advanced past the blocking icon 135-1 of FIG. 2. The timeline 120 also displays the downloaded video icon 130 indicating the segment of the first video 145 that is downloaded and available for the user to view prior to reaching the next blocking icon 135-2. The timeline 120 also displays the locations in the first video 145 where the remaining blocking icons 135-N (i.e., 135-3, 135-4, and 135-5) are located. FIG. 4 also illustrates a non viewable icon 150 depicting a segment of the first video 145 that is downloaded. However, a user cannot advance through that segment of the first video 145. In this example, the non viewable icon 150 is at the same location as a blocking icon 135-2.

Figure 5:
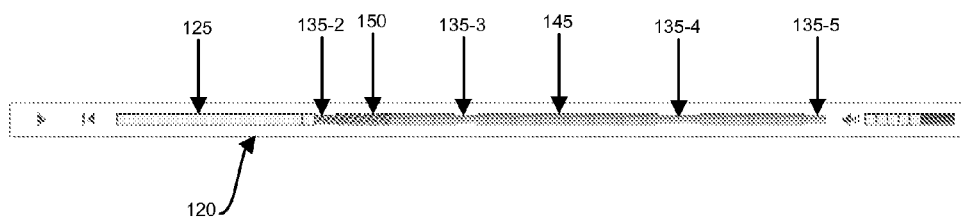
FIG. 5 illustrates an example timeline where the viewable video icon encounters another second video to view, according to one embodiment disclosed herein.
Figure 6:
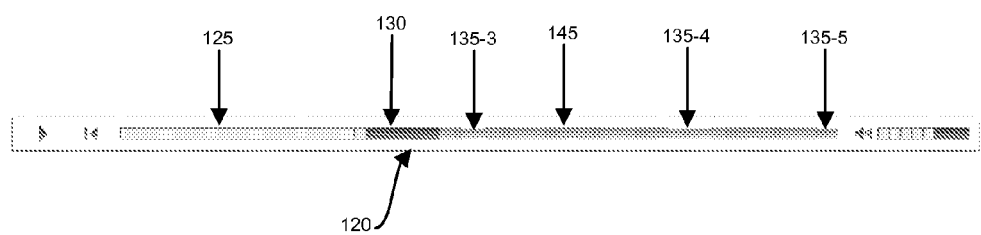
FIG. 6 illustrates an example timeline where additional segments of the first video become viewable after the second video is viewed, according to one embodiment disclosed herein.

FIG. 5 illustrates an example timeline 120 containing a first video 145, and a second video. The timeline 120 displays the viewable video icon 125 carving through the blocking icon 135-2. In other words, the user is viewing a second video (i.e., an advertisement). The timeline 120 also displays the locations in the first video 145 where the remaining blocking icons 135-N (i.e., 135-3, 135-4, and 135-5) are located. FIG. 5 also illustrates a non viewable icon 150 depicting a segment of the first video 145 that is downloaded. However, a user cannot advance through that segment of the first video 145. FIG. 6 illustrates an example timeline 120 containing a first video 145 where viewable video icon 125 has advanced past the blocking icon 135-2 displayed in FIG. 5. Thus, the blocking icon 135-2 no longer exists in this example timeline 120. The timeline 120 displays the downloaded video icon 130 indicating the segment of the first video 145 available for the user to view. The viewable video icon 125 represents how far along the timeline 120 the user has viewed the first video 145. The timeline 120 also displays the locations in the first video 145 where the remaining blocking icons 135-N (i.e., 135-3, 135-4, and 135-5) are located.

Figure 7:
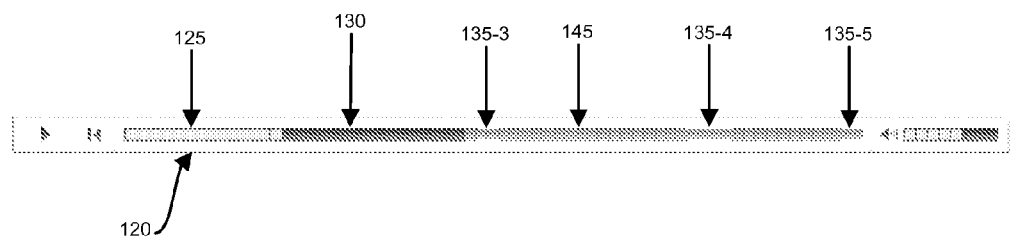
FIG. 7 illustrates an example timeline where a user rewinds the first video, according to one embodiment disclosed herein.

FIG. 7 illustrates an example timeline 120 containing a first video 145 where the user has moved the viewable video icon 125 back to an already viewed segment of the first video 145. In other words, the user selected to rewind the first video 145. The timeline 120 displays that because the user has already viewed (the advertisement rendered at the location of the) blocking icon 135-1 and blocking icon 135-2, they are no longer rendered in the timeline 120. Thus, the timeline 120 indicates that the user does not have to view the second videos 150 (not shown) associated with blocking icon 135-1 and blocking icon 135-2. The timeline 120 displays the downloaded video icon 130 indicating the segment of the first video 145 available for the user to view. The timeline 120 also displays the locations in the first video 145 where the remaining blocking icons 135-N (i.e., 135-3, 135-4, and 135-5) are located.

Figure 8:
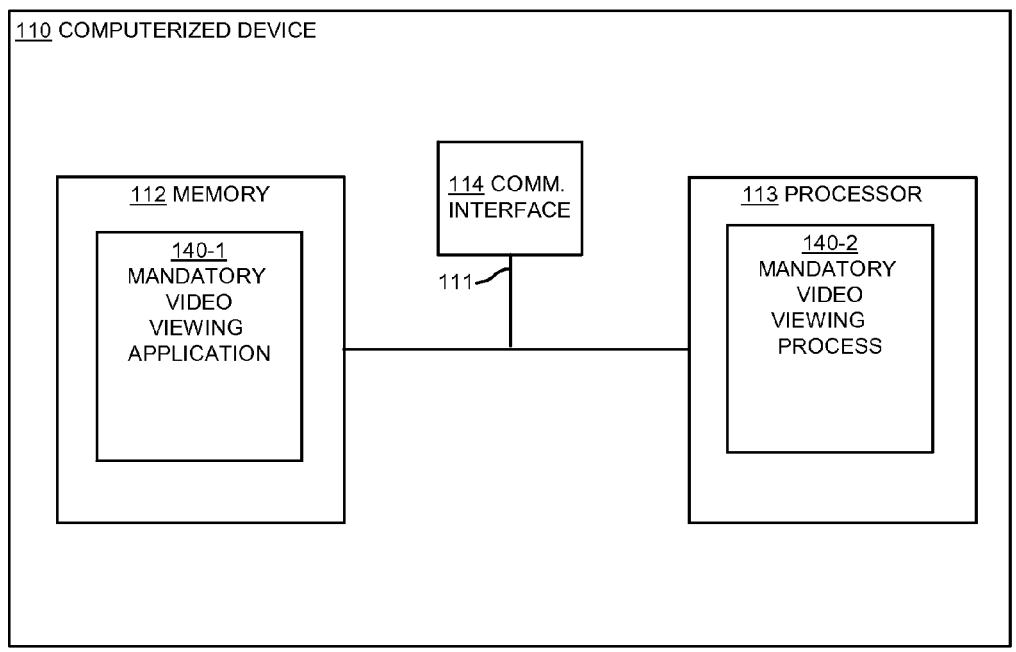
FIG. 8 shows a high-level block diagram of a computer system according to one embodiment disclosed herein.

FIG. 8 illustrates an example architecture of a computer system 110 on which the mandatory video viewing process 140-2 operates. The computer system 110 may be any type of computerized device such as a personal computer, workstation, portable computing device, console, laptop, network terminal or the like. In this example, the computer system 110 includes an interconnection mechanism 111 that couples a memory system 112, a processor 113, and a communications interface 114. The communications interface 114 enables the computer system 110 to communicate with other devices (i.e., other computers) on a network (not shown). This can allow access to mandatory video viewing application 140-1 by remote computer systems.

The memory system 112 may be any type of computer readable medium that is encoded with an mandatory video viewing application 140-1 that may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of mandatory video viewing application 140-1. Execution of mandatory video viewing application 140-1 in this manner produces processing functionality in a mandatory video viewing process 140-2. In other words, mandatory video viewing process 140-2 represents one or more portions of runtime instances of mandatory video viewing application 140-1 (or the entire mandatory video viewing application 140-1) performing or executing within or upon the processor 113 in the computerized system 110 at runtime. It is to be understood that embodiments disclosed herein include the applications/software (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications/software operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the mandatory video viewing process 140-2.

Figure 9:
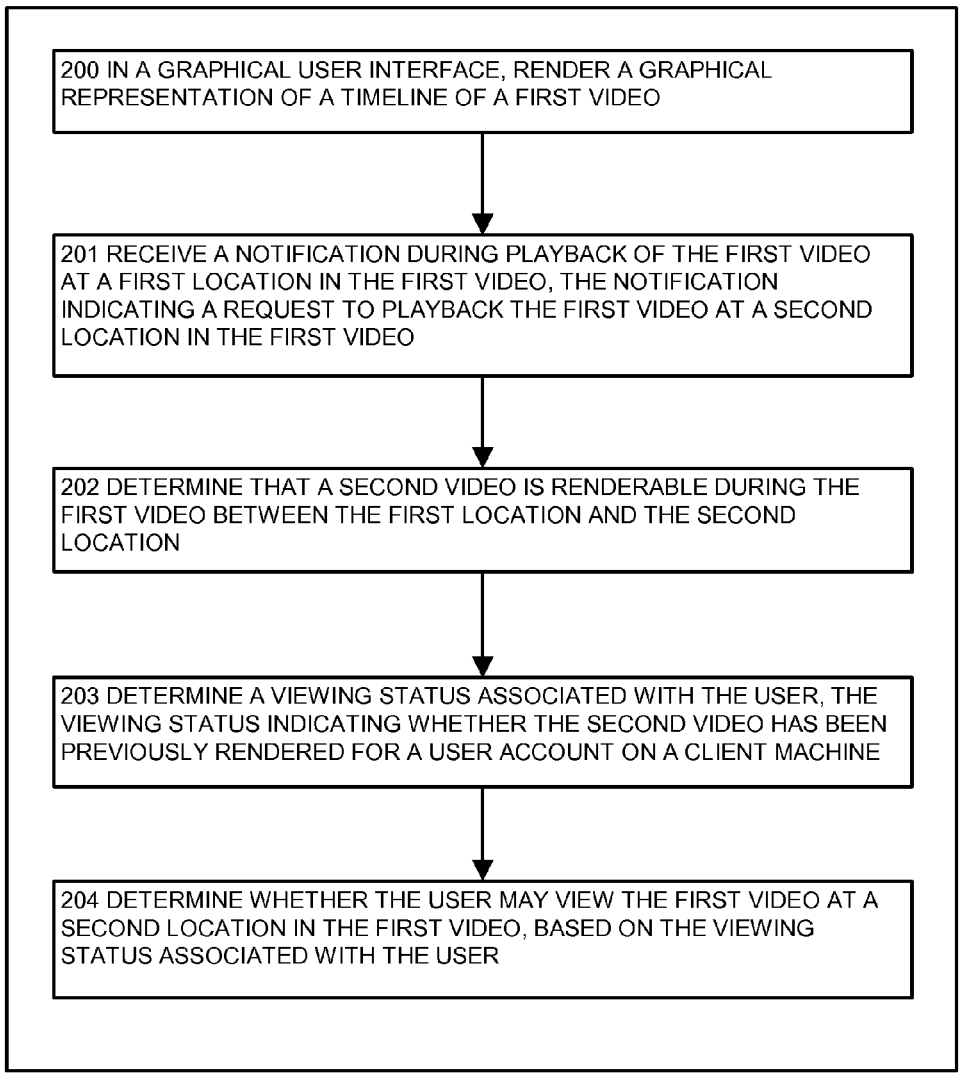
FIG. 9 illustrates a flowchart of a procedure performed by the system of FIG. 8, when the mandatory video viewing process renders a graphical representation of a timeline of a first video in a graphical user interface, according to one embodiment disclosed herein.

FIG. 9 is an embodiment of the steps performed by the mandatory video viewing process 140-2 when it renders a graphical representation of a timeline 120 of a first video 145 in a graphical user interface.

In step 200, the mandatory video viewing process 140-2 renders a graphical representation of a timeline 120 of a first video 145 in a graphical user interface. In an example embodiment, a user downloads a first video 145 from a web site, and renders the first video 145 in a video viewing application. The video viewing application provides the user with graphical icons allowing the user to control the rendering of the first video 145. For example, the user may rewind, pause or fast forward the first video 145.

In step 201, the mandatory video viewing process 140-2 receives a notification during playback of the first video 145 at a first location in the first video 145. The notification indicates a request to playback the first video 145 at a second location in the first video 145. In an example embodiment, a user is viewing the first video 145 and decides to advance (i.e., fast forward) through the first video 145. The user selects the viewable video icon 125 and begins to move the viewable video icon 125 from the first location (i.e., its current position) toward the second location.

In step 202, the mandatory video viewing process 140-2 determines that a second video is renderable during the first video 145 between the first location and the second location. In an example embodiment, a publisher of the first video 145 has determined that advertisements are to be inserted at various points along the first video 145. When the user attempts to move the viewable video icon 125 from the first location toward the second location, the mandatory video viewing process 140-2 determines that there exists a second video (i.e., an advertisement) located somewhere between the first location and the second location.

In step 203, the mandatory video viewing process 140-2 determines a viewing status associated with the user. The viewing status indicates whether the second video has been previously rendered for a user account on a client machine (i.e., whether the second video has been previously rendered for the user account on the client machine). During the rendering of the first video 145, the second video is a segment of video that the user is required to view (i.e., the user cannot 'fast forward' through this segment of the second video until after the user has viewed the second video at least once). The mandatory video viewing process 140-2 maintains a viewing status associated with each user to keep track of whether or not the user has viewed the second video.

In step 204, the mandatory video viewing process 140-2 determines whether the user may view the first video 145 at a second location in the first video 145, based on the viewing status associated with the user. The mandatory video viewing process 140-2 obtains the viewing status associated with the user. If the user has previously viewed the second video, the user may advance past the second video. If the user has not previously viewed the second video, then the timeline 120 displays a blocking icon 135-1 indicating that the user may not advance past the blocking icon 135-1 until the second video has been viewed. In other words, as the user is viewing the first video 145, the user may attempt to advance the first video 145 using a sliding bar provided by the video viewing application. The user slides the sliding bar along a timeline 120 representing the length of the first video 145. The timeline 120 displays how far (into the first video 145) the user may advance the first video 145 using the sliding bar. If the user has not already viewed advertisements (i.e., a second video) in the first video 145, the mandatory video viewing process 140-2 displays a blocking icon 135-1 in the timeline 120 that represents the first video 145. If the user has already viewed that advertisement (i.e., a second video), the blocking icon 135-1 is not rendered on the timeline 120.

FIG. 10 is an embodiment of the steps performed by the mandatory video viewing process 140-2 when it renders a graphical representation of a timeline 120 of a first video 145 in a graphical user interface.

In step 205, the mandatory video viewing process 140-2 renders a graphical representation of a timeline 120 of a first video 145 in a graphical user interface. The timeline 120 allows a user to see how far along the first video 145 has been rendered. The timeline 120 maps to the length of the first video 145 where the left most point of the timeline 120 corresponds to the beginning of the first video 145, and the right most point of the timeline 120 corresponds to the end of the first video 145.

In step 206, the mandatory video viewing process 140-2 renders a viewable video icon 125 indicating a segment of the video that has been viewed by the user. The viewable video icon 125 provides a visual representation of how much of the first video 145 has been rendered. Using the viewable video icon 125, a user may rewind or (attempt to) advance along the timeline 120 of the first video 145.

Alternatively, in step 207, the mandatory video viewing process 140-2 renders a downloaded video icon 130 indicating a segment of the video that has been downloaded and available to the user to view. The downloaded video icon 130 indicates the segment of the first video 145 through which the user is able to advance. In other words, the downloaded video icon 130 provides a graphical representation of how far the user may fast forward through the first video 145 before encountering the next blocking icon 135-2.

Figure 11:
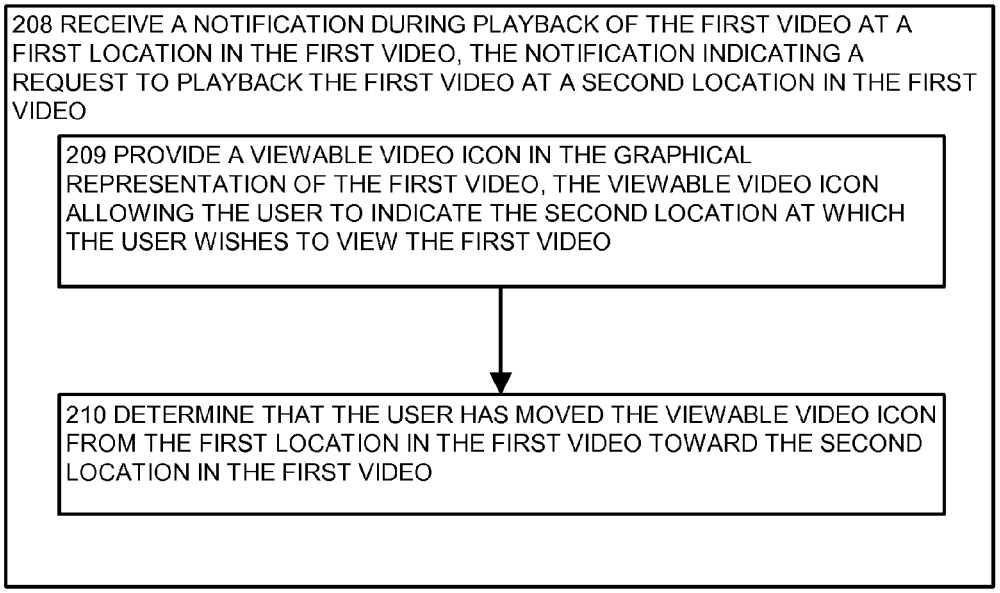
FIG. 11 illustrates a flowchart of a procedure performed by the system of FIG. 8, when the mandatory video viewing process receives a notification from a user viewing the first video at a first location in the first video, according to one embodiment disclosed herein.

FIG. 11 is an embodiment of the steps performed by the mandatory video viewing process 140-2 when it receives a notification during playback of the first video 145 at a first location in the first video 145.

In step 208, the mandatory video viewing process 140-2 receives a notification during playback of the first video 145 at a first location in the first video 145. The notification indicates a request to playback the first video 145 at a second location in the first video 145. In other words, the user selects the viewable video icon 125 and moves it along the timeline 120 to render the first video 145 at a different location along the timeline 120. In this scenario, the user is attempting to fast forward through the first video 145.

In step 209, the mandatory video viewing process 140-2 provides a viewable video icon 125 in the graphical representation of the first video 145. The viewable video icon 125 allows the user to indicate the second location at which the user wishes to view the first video 145. Using the graphical user interface, the user points an input device, such as a mouse, on the viewable video icon 125, and selects the viewable video icon 125. The user then begins to move the position of the viewable video icon 125 from the first location (i.e., the current location of the viewable video icon 125) to a location further along the timeline 120. In other words, the user wishes to advance (i.e., fast forward through) the first video 145.

In step 210, the mandatory video viewing process 140-2 determines that the user has moved the viewable video icon 125 from the first location in the first video 145 toward the second location in the first video 145. If there are no blocking icons 135-N between the first location and the second location, then the user may move the viewable video icon 125 from the first location to the second location. However, if there are any second videos 150 in between the first location and the second location, then the mandatory video viewing process 140-2 renders a blocking icon 135-2 indicating to the user that the user cannot advance the viewable video icon 125 to the second location without first viewing the second video at the location of the blocking icon 135-2.

FIG. 12 is an embodiment of the steps performed by the mandatory video viewing process 140-2 when it determines that a second video is renderable during the first video 145 between the first location and the second location.

In step 211, the mandatory video viewing process 140-2 determines that a second video is renderable during the first video 145 between the first location and the second location. When the user attempts to move the viewable video icon 125 from the first location toward the second location, the mandatory video viewing process 140-2 determines that there exists a second video located somewhere between the first location and the second location.

In step 212, the mandatory video viewing process 140-2 identifies the second video as an advertisement. In an example embodiment, the second video is an advertisement to be rendered during the first video 145. In other words, a publisher creating the first video 145 has determined that the first video 145 is to be rendered, then paused, then the second video (i.e., an advertisement) is to be rendered, and then the rendering of the first video 145 is to be resumed.

Alternately, in step 213, the mandatory video viewing process 140-2 identifies that viewing the second video is mandatory. In an example embodiment, the first video 145 is a training video, and the second video represents segments of the training video that are mandatory for trainees to view. In other words, users viewing the training video are not allowed to advance (i.e., fast forward) through these mandatory segments.

Alternately, in step 214, the mandatory video viewing process 140-2 receives a playlist indicating at least one of:
  i) the second video, and
  ii) a location in the first video 145 in which the second video is to be rendered.

In an example embodiment, the publisher of the first video 145 creates a playlist that contains information associated with the first video 145, including which second video to render during the first video 145 and where, within the first video 145, the second video is to be rendered.

In step 215, the mandatory video viewing process 140-2 renders the second video according to the playlist. The mandatory video viewing process 140-2 renders the second video at the locations in the first video 145 as specified by the playlist.

Figure 13:
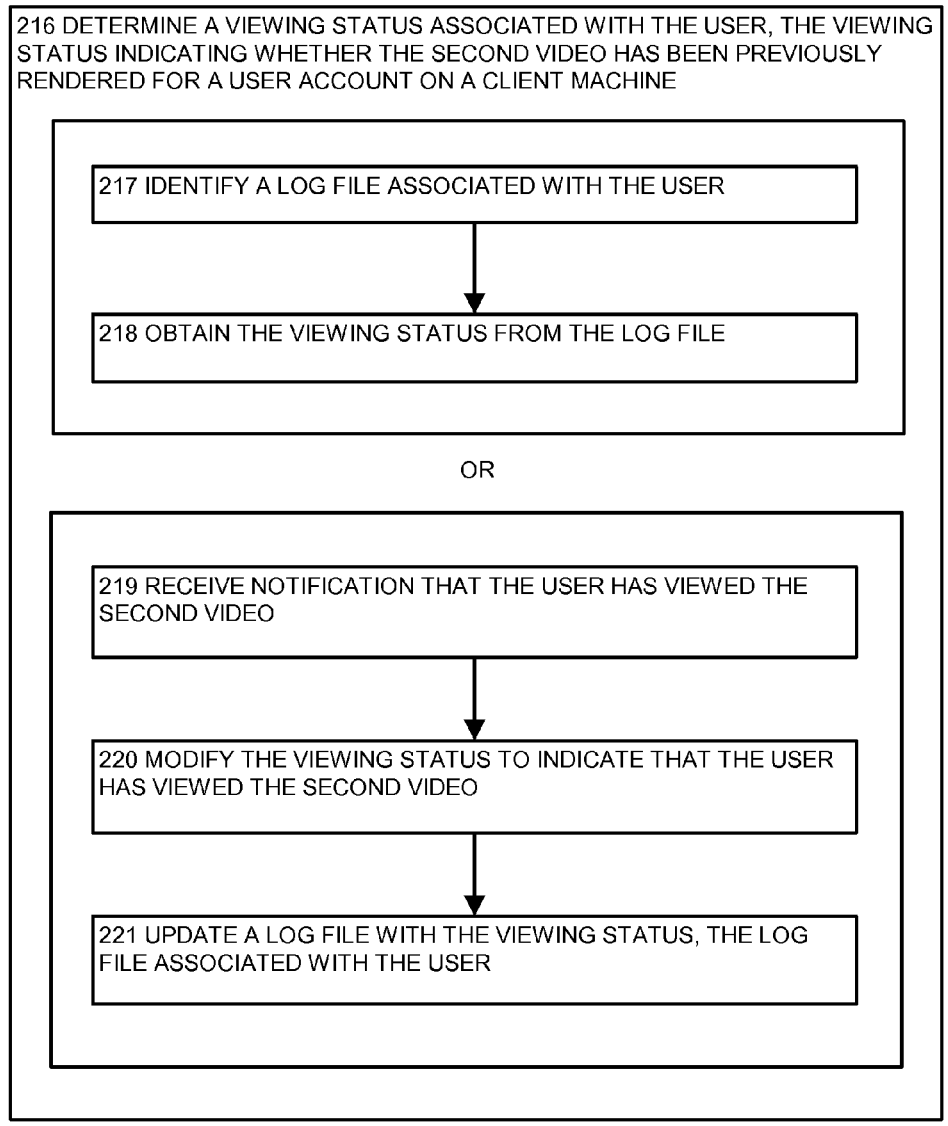
FIG. 13 illustrates a flowchart of a procedure performed by the system of FIG. 8, when the mandatory video viewing process determines a viewing status associated with the user, the viewing status indicating whether the second video has been previously rendered for a user account on a client machine, according to one embodiment disclosed herein.

FIG. 13 is an embodiment of the steps performed by the mandatory video viewing process 140-2 when it determines a viewing status associated with the user.

In step 216, the mandatory video viewing process 140-2 determines a viewing status associated with the user. The viewing status indicates whether the second video has been previously rendered for a user account on a client machine. The mandatory video viewing process 140-2 maintains information associated with whether the user has viewed the second video or not. For example, the mandatory video viewing process 140-2 may maintain this information in a database, file, etc.

In step 217, the mandatory video viewing process 140-2 identifies a log file associated with the user. In an example embodiment, the mandatory video viewing process 140-2 maintains an eXtensible Markup Language (XML) log file in which to maintain the viewing status associated with the user.

In step 218, the mandatory video viewing process 140-2 obtains the viewing status from the log file. In an example embodiment, the mandatory video viewing process 140-2 opens the log file, and obtains the viewing status associated with the user. In another example embodiment, a video viewing application tracks those users who are viewing the first video 145 via the video viewing application. The video viewing application maintains a separate log file for each of those users.

Alternatively, in step 219, the mandatory video viewing process 140-2 receives notification that the user has viewed the second video. In other words, the user has viewed the first video 145, encountered the second video, and viewed the second video.

In step 220, the mandatory video viewing process 140-2 modifies the viewing status to indicate that the user has viewed the second video. The mandatory video viewing process 140-2 modifies the viewing status from "Not Viewed" to "Viewed".

In step 221, the mandatory video viewing process 140-2 updates a log file associated with the user with the viewing status. The mandatory video viewing process 140-2 updates the log file to change the viewing status associated with the user from "Not Viewed" to "Viewed".

Figure 14:
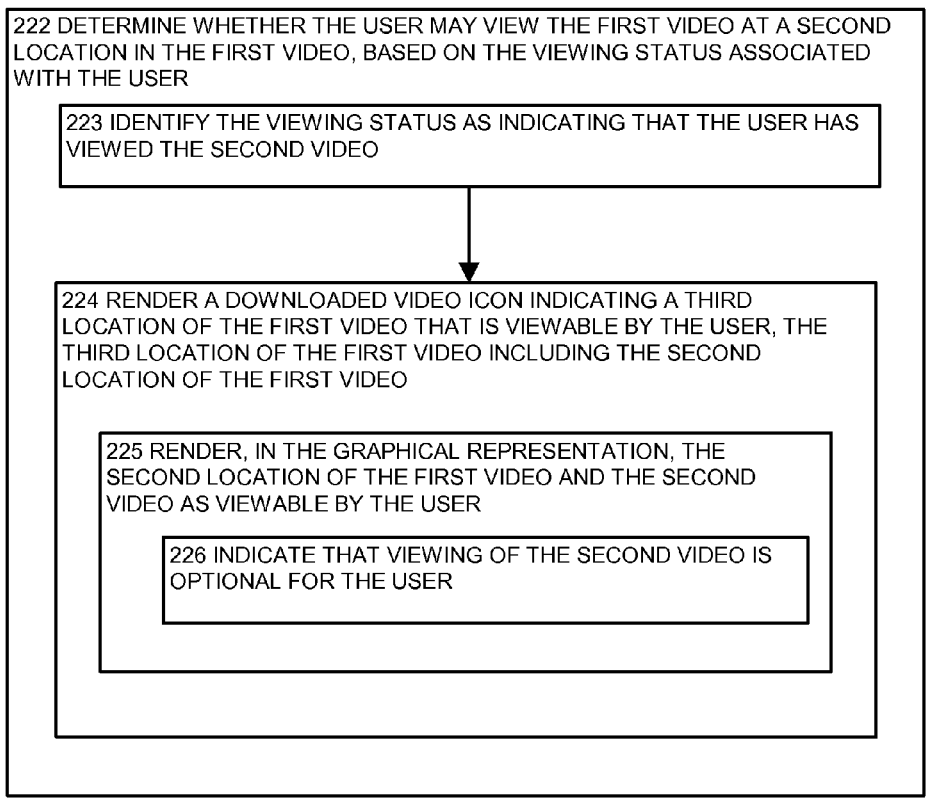
FIG. 14 illustrates a flowchart of a procedure performed by the system of FIG. 8, when the mandatory video viewing process determines whether the user may view the first video at a second location in the first video, based on the viewing status associated with the user, according to one embodiment disclosed herein.

FIG. 14 is an embodiment of the steps performed by the mandatory video viewing process 140-2 when it determines whether the user may view the first video 145 at a second location in the first video 145, based on the viewing status associated with the user.

In step 222, the mandatory video viewing process 140-2 determines whether the user may view the first video 145 at a second location in the first video 145, based on the viewing status associated with the user. If the user has viewed the second video, the user may advance the timeline 120 to view the first video 145 at the second location.

In step 223, the mandatory video viewing process 140-2 identifies the viewing status as indicating that the user has viewed the second video. In other words, the user has viewed the advertisement (located at the position of the blocking icon 135-1) rendered in the first video 145.

In step 224, the mandatory video viewing process 140-2 renders a downloaded video icon 130 indicating a third location of the first video 145 that is viewable by the user. The third location of the first video 145 includes the second location of the first video 145. Once the user has viewed the second video, the mandatory video viewing process 140-2 updates the timeline to include a downloaded video icon 130 indicating segments of the first video 145 that are both downloaded and available for the user to view. In other words, the timeline 120 displays to the user how far along the timeline 120 the user can advance the viewable video icon 125.

In step 225, the mandatory video viewing process 140-2 renders, in the graphical representation, the second location of the first video 145, and the second video as viewable by the user. As shown in FIG. 6, the downloaded video icon 130 is rendered along the timeline 120 distinctly different from the segments of the first video 145 that have already been viewed by the user (as displayed by the viewable video icon 125) and the remaining blocking icons 135-N (i.e., 135-3, 135-4 and 135-5) located in the first video 145. The second video still exists in the first video 145. That is, the advertisement is still rendered within the first video 145 even though the user is not required to view that advertisement again.

In step 226, the mandatory video viewing process 140-2 indicates that viewing of the second video is optional for the user. In an example embodiment, even though the user has previously viewed the second video, the second video is still available in the first video 145 for the user to view. However, viewing of the second video a subsequent time is optional for the user.

FIG. 15 is an embodiment of the steps performed by the mandatory video viewing process 140-2 when it identifies the viewing status as indicating that the user has viewed the second video.

In step 227, the mandatory video viewing process 140-2 identifies the viewing status as indicating that the user has viewed the second video. In other words, the user has viewed the second video (i.e., an advertisement).

In step 228, the mandatory video viewing process 140-2 renders a blocking icon 135-1 indicating that the user must view the second video again prior to viewing the first video 145 at the second location. In an example embodiment, a publisher has determined that a user must view the second video each time the first video 145 is rendered.

Alternatively, in step 229, the mandatory video viewing process 140-2 removes the second video from the first video 145. In an example embodiment, the mandatory video viewing process 140-2 removes the second video from the first video 145 once the user has viewed the first video 145.

Alternatively, in step 230, the mandatory video viewing process 140-2 replaces the second video with a third video. In an example embodiment, once the user has viewed the second video (i.e., an advertisement), the mandatory video viewing process 140-2 replaces that advertisement with a different advertisement.

FIG. 16 is an embodiment of the steps performed by the mandatory video viewing process 140-2 when it determines whether the user may view the first video 145 at a second location in the first video 145, based on the viewing status associated with the user.

In step 231, the mandatory video viewing process 140-2 determines whether the user may view the first video 145 at a second location in the first video 145, based on the viewing status associated with the user. The mandatory video viewing process 140-2 determines whether the user may advance the first video 145 based on whether or not the user has viewed the second video within the first video 145.

In step 232, the mandatory video viewing process 140-2 identifies the viewing status as indicating that the user has not viewed the second video. In an example embodiment, the user has attempted to advance the viewable video icon 125 from a first location to a second location. A second video is rendered between the first location and the second location. The mandatory video viewing process 140-2 determines that the user has not yet viewed the second video.

In step 233, the mandatory video viewing process 140-2 renders a blocking icon 135-2 indicating that the user may not view the first video 145 at the second location until the user has viewed the second video. The mandatory video viewing process 140-2 determines that the user has not yet viewed the second video (i.e., an advertisement) and renders a blocking icon 135-2 on the timeline 120 to indicate that the user cannot advance the viewable video icon 125 along the timeline 120 beyond the blocking icon 135-2.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method for providing a timeline for navigating playback of a video along with mandatory ads and preventing a skip past the mandatory ads in the timeline until the mandatory ads are viewed, the method comprising:
   in a graphical user interface of a computing device, rendering a graphical representation of a timeline for playback of the video and the mandatory ads;
   during playback, rendering on the timeline a first icon indicating a completed portion, a second icon indicating a downloaded portion, and blocking icons indicating mandatory ads;
   during playback, receiving a navigation command on the timeline to advance playback beyond a mandatory ad that has not been rendered and prohibiting advancing playback during the video to any portion of the timeline beyond the mandatory ad until the mandatory ad has been rendered, wherein a blocking icon corresponding to the mandatory ad is removed from the rendering of the timeline subsequent to the mandatory ad being rendered; and
   extending the second icon based on the mandatory ad being rendered.

2. The method of claim 1, further comprising receiving, during playback, a navigation command on the timeline to advance playback without going beyond any mandatory ad that has not been rendered and allowing advancing of the playback.

3. The method of claim 1, further comprising pausing playback of the video during playback of the mandatory ads.

4. The method of claim 1, further comprising:
   receiving a notification that a user has viewed the mandatory ad;
   modifying a viewing status to indicate that the user has viewed the mandatory ad; and
   updating a log file with the viewing status, the log file being associated with the user.

5. The method of claim 1, wherein the mandatory ad is removed from the timeline for playback subsequent to the mandatory ad being rendered for a user.

6. The method of claim 1, further comprising adjusting a current position of the playback to a requested position based at least in part upon determining that none of the mandatory ads is required prior to resuming the playback at the requested position.

7. A non-transitory computer readable storage medium having executable instructions stored thereon, that, when executed by a computing device, cause the computing device to perform operations for providing a timeline for navigating playback of a video along with mandatory ads and preventing a skip past the mandatory ads in the timeline until the mandatory ads are viewed, the operations comprising:
   rendering, in a graphical user interface of a computing device, a graphical representation of a timeline for playback of a video and the mandatory ads;
   rendering, during playback, on the timeline a first icon indicating a completed portion, a second icon indicating a downloaded portion, and blocking icons indicating mandatory ads;
   receiving, during playback, a navigation command on the timeline to advance playback beyond a mandatory ad that has not been rendered and prohibiting advancing playback during the video to any portion of the timeline beyond the mandatory ad until the mandatory ad has been rendered, wherein a blocking icon corresponding to the mandatory ad is removed from the rendering of the timeline subsequent to the mandatory ad being rendered; and
   extending the second icon based on the mandatory ad being rendered.

8. The non-transitory computer readable storage medium of claim 7, the operations comprising receiving, during playback, a navigation command on the timeline to advance playback without going beyond any mandatory ad that has not been rendered and allowing advancing of the playback.

9. The non-transitory computer readable storage medium of claim 7, the operations further comprising pausing playback of the video during playback of the mandatory ads.

10. The non-transitory computer readable storage medium of claim 7, the operations further comprising:
    receiving notification that a user has viewed the mandatory ad;
    modifying a viewing status to indicate that the user has viewed the mandatory ad; and
    updating a log file with the viewing status, the log file being associated with the user.

11. The non-transitory computer readable storage medium of claim 7, wherein the mandatory ad is removed from the timeline for playback subsequent to the mandatory ad being rendered for a user.

12. The non-transitory computer readable storage medium of claim 7, the operations further comprising adjusting a current position of the playback to a requested position based at least in part upon determining that none of the mandatory ads is required prior to resuming the playback at the requested position.

13. A system, comprising:
    a computing device comprising a processor; and
    a memory having executable instructions stored thereon, that, if executed by the processor, cause the system to perform operations for providing a timeline for navigating playback of a video along with mandatory ads and preventing a skip past the mandatory ads in the timeline until the mandatory ads are viewed, the operations comprising:
    rendering, in a graphical user interface, a graphical representation of a timeline for playback of a video and the mandatory ads,
    rendering, during playback, on the timeline a first icon indicating a completed portion, a second icon indicating a downloaded portion, and blocking icons indicating mandatory ads, receiving, during playback, a navigation command on the timeline to advance playback beyond a mandatory ad that has not been rendered and prohibiting advancing playback during the video to any portion of the timeline beyond the mandatory ad until the mandatory ad has been rendered, wherein a blocking icon corresponding to the mandatory ad is removed from the rendering of the timeline subsequent to the mandatory ad being rendered, and extending the second icon based on the mandatory ad being rendered.

14. The system of claim 13, the operations further comprising receiving, during playback, a navigation command on the timeline to advance playback without going beyond any mandatory ad that has not been rendered and allowing advancing of the playback.

15. The system of claim 13, the operations further comprising pausing playback of the video during playback of the mandatory ads.

16. The system of claim 13, the operations further comprising:

receiving notification that a user has viewed the mandatory ad;

modifying a viewing status to indicate that the user has viewed the mandatory ad; and updating a log file with the viewing status, the log file being associated with the user.

17. The system of claim 13, wherein the mandatory ad is removed from the timeline for playback subsequent to the mandatory ad being rendered for a user.

18. The system of claim 13, the operations further comprising adjusting a current position of the playback to a requested position based at least in part upon determining that none of the mandatory ads is required prior to resuming the playback at the requested position.

\* \* \* \* \*